United States Patent [19]

Sands

[11] Patent Number: 4,555,423

[45] Date of Patent: Nov. 26, 1985

[54] MULTICOLORED UNITARY THERMOFORMED ARTICLE

[75] Inventor: Howard E. Sands, Broadalbin, N.Y.

[73] Assignee: Coleco Industries, Inc., West Hartford, Conn.

[21] Appl. No.: 624,452

[22] Filed: Jun. 25, 1984

[51] Int. Cl.[4] .............................................. B44C 5/04
[52] U.S. Cl. .................................... 428/79; 428/542.8; 428/913.3
[58] Field of Search ................ 156/224, 285; 264/510, 264/511; 428/16, 913.3, 79, 542.8; 4/513

[56] References Cited

U.S. PATENT DOCUMENTS

| | | | |
|---|---|---|---|
| 2,807,564 | 9/1957 | Mitchell | 428/79 |
| 2,859,152 | 11/1958 | Markus et al. | 428/79 X |
| 3,497,877 | 3/1970 | Diemond et al. | 4/513 |
| 3,633,221 | 1/1972 | Addison et al. | 4/513 |
| 3,655,485 | 4/1972 | Zompa | 428/79 X |
| 4,194,938 | 3/1980 | Figge et al. | 156/285 X |
| 4,307,058 | 12/1981 | Morrello et al. | 264/510 |
| 4,311,181 | 1/1982 | Hausch | 428/79 X |
| 4,474,725 | 10/1984 | Sands | 264/511 X |

*Primary Examiner*—Henry F. Epstein

[57] ABSTRACT

A multicolored thermoformed article is prepared by initially forming thermoplastic resin of a first color into a contoured design configuration. This preformed element is then placed in a thermoforming mold having an insert-receiving portion of complimentary contour and additional contours outwardly of the insert-receiving portion. Thermoplastic sheeting of a second color is then thermoformed against the surfaces of the mold and of the insert to produce the composite article in which the adjacent surface of the insert is thoroughly bonded to the sheeting of the second coloration. The process may be utilized to produce articles in which more than one preformed element is incorporated, and such multiple preformed elements may be of the same or distinct configurations and of the same or distinct colorations.

8 Claims, 9 Drawing Figures

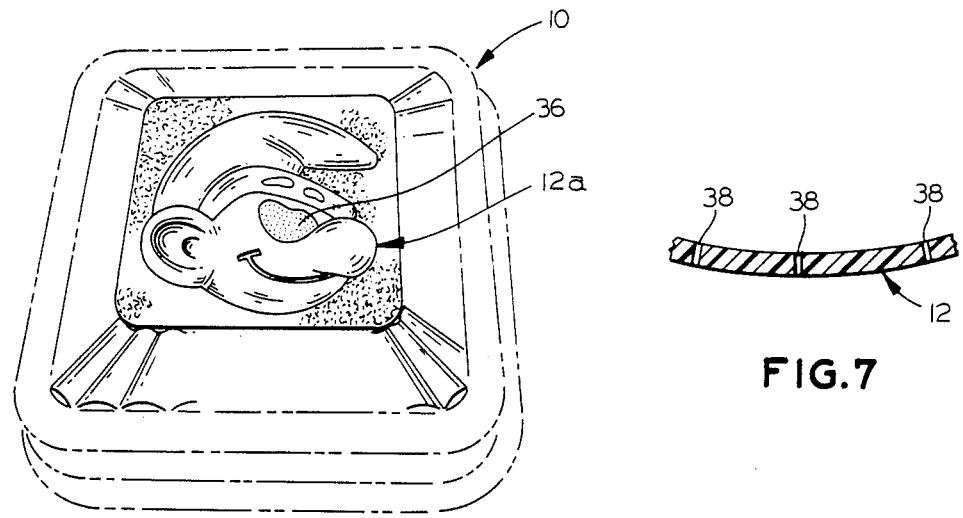
FIG. 6
FIG. 7
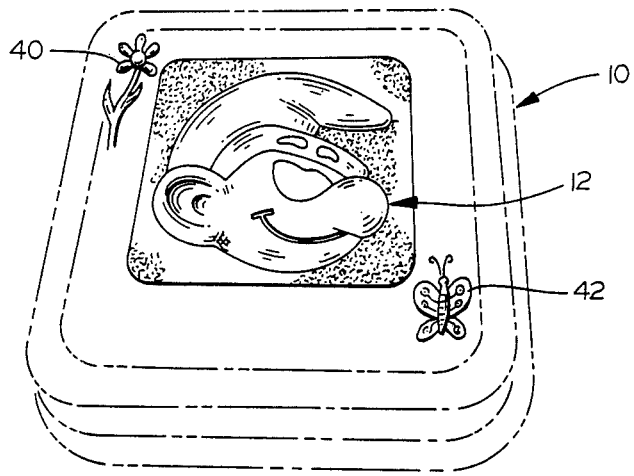
FIG. 8
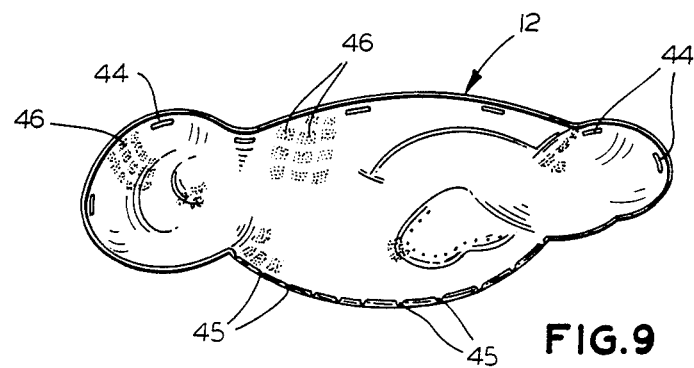
FIG. 9

MULTICOLORED UNITARY THERMOFORMED ARTICLE

CROSS REFERENCE TO RELATED APPLICATIONS

The present application is a division of application Ser. No. 502,257 filed June 8, 1983, now issued as U.S. Pat. No. 4,474,725, granted Oct. 2, 1984.

BACKGROUND OF THE INVENTION

The present invention relates to the manufacture of thermoformed articles such as children's toys, and more particularly to such thermoformed articles in multicolored configurations of various types.

Thermoforming of synthetic resinous sheet material is widely employed in the manufacture various types of children's toys such as swimming pools, sleds, sandboxes, toboggans and the like as well as in the manufacture of various industrial articles, packaging and vehicle components. Various techniques have been proposed to provide multicolored and diverse configurations for such thermoformed articles including techniques of dying, painting or otherwise applying a differential color coating to the surface of the thermoformed product.

In some instances it has been proposed to utilize adhesively applied laminated films and sheeting to effect multicolored patterns for the thermoformed article. Moreover, some multicolored articles have utilized polychromic extrusions for the sheet material which is thermoformed. However, some of the above techniques have involved limitations as to the configuration or depth of the multicolored component within the overall configuration of the thermoformed article, others have provided a relatively thin surface coating upon the article which might be readily abradable so as to become unsightly after a relatively short period of time; wear-resistant laminates have been relative costly.

It is an object is to provide a unitary multicolored thermoplastic article which includes a body element and an insert element on one surface thereof which is bonded thereto to provide a unitary structure and which provides a multicolored component with respect to the surrounding body.

Another object is to provide such an article in which two or more such differentially colored inserts are provided and bonded at spaced points to the body member.

SUMMARY OF THE INVENTION

It has now been found that the foregoing and related objects may be readily attained by a process in which thermoplastic resin of a first color is formed into a configuration having at least two discrete depths to form an insert member, after which the preformed insert member is placed in a thermoforming mold having an insert receiving portion of complimentary contour spaced from the margins of the mold and having contours outwardly of the insert receiving portion. Thermoplastic sheeting of a second color is then thermoformed against the surfaces of the mold and of the exposed surface of the insert to cause the sheeting to assume a configuration which is complimentary to that of the mold and to concurrently bond the adjacent surface of the insert thereto and thereby produce a unitary thermoformed article of multicolored configuration.

Desirably the first and second colored resins are formed from the same polymer, and the mold is maintained at a temperature to transfer heat into the insert member seated therein to facilitate the bonding process.

Customarily, the thermoforming step will include the drawing of the vacuum through the mold to draw the heated thermoplastic sheeting tightly against the surface of the mold and the exposed surface of the insert member. Desirably, the insert member has a multiplicity of apertures therethrough, and vacuum may be drawn through the apertures to facilitate drawing of the sheeting tightly against the exposed surface of the insert. Alternatively, the exposed surface of the insert may be textured to permit evacuation of air from the interfacing portions of the insert member and the second colored thermoplastic sheeting as it is drawn thereagainst.

In accordance with one embodiment of the invention, the insert member has apertures therein which are dimensioned to expose the second colored thermoplastic sheeting therethrough as elements of the design denoted by the insert. In addition, the insert member may include other small apertures spaced thereabout through which the vacuum is drawn and which are dimensioned sufficiently small so as to substantially conceal the color of the second thermoplastic sheeting.

The resultant product is a unitary multicolored thermoplastic article including a body element and an insert element on one surface thereof which is of lesser dimension so as to provide an exposed peripheral portion about the insert element. In this structure, the insert element provides a layer above the one surface of the body element and is differentially colored with respect thereto, but both body and insert elements are bonded together at their interfacing portions and have complimentary contours in the area of the insert element so as to provide a first design component for the thermoplastic article. In addition, the body element has a multiplicity of additional contours in the peripheral portion about the insert element.

In accordance with the preferred aspect of the invention, the body and insert elements are bonded together by their own substance, and the insert element may have small apertures therethrough dimensioned to permit drawing a vacuum but substantially concealing the color of the body element thereunder.

In accordance with an embodiment of the invention, the insert element has relatively large apertures therethrough dimensioned to expose the coloration of the body element therethrough whereby the coloration of the body element provides elements of a design denoted by the configuration and contours of the insert. It will be appreciated that two or more insert elements may be provided in a single thermoplastic article so as to provide a multiplicity of design components, and the insert elements may each be of distinctive coloration and may employ distinctive design configuration.

BRIEF DESCRIPTION OF THE DRAWINGS

FIG. 6 is a partially diagrammatic view of a sandbox cover provided by use of an insert with apertures of sufficient size to expose the coloration of the underlying sheet material as a color element in the insert;

FIG. 7 is a partially diagrammatic section view of an insert provided with relatively small holes for drawing of a vacuum through the insert;

FIG. 8 is a partially diagrammatic view of a thermoformed sandbox cover using a plurality of inserts to provide different design components; and FIG. 9 is a partially diagrammatic view of an insert provided with a textured surface to facilitate evacuation of the air between the insert and the large sheet drawn thereagainst.

DETAILED DESCRIPTION OF THE ILLUSTRATED EMBODIMENTS

Figure 1:
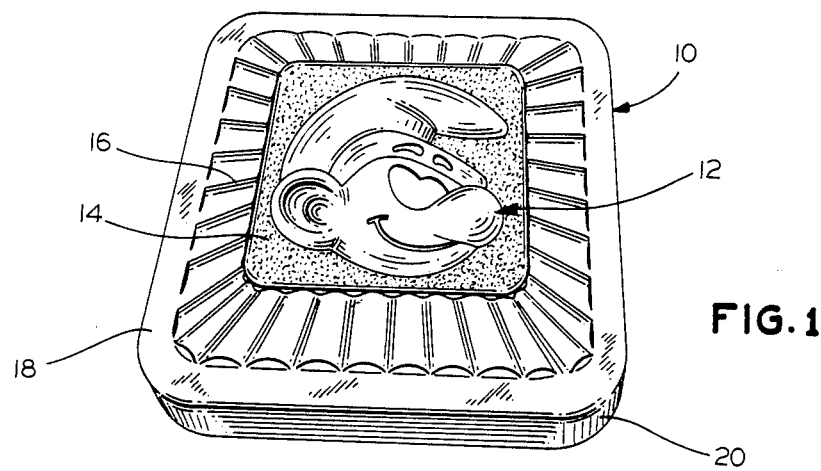
FIG. 1 is a perspective view of the top surface of a child's sandbox cover fabricated in accordance with the present invention.

Turning first in detail to FIG. 1 of the attached drawings, therein illustrated is a child's sandbox cover embodying the present invention and comprised of the body element generally designated by the numeral 10, and the insert element generally designated by the numeral 12 and which is bonded thoroughly to the body element 10 so as to provide a unitary structure. The insert element 12 is differentially colored with respect to the body element 10 so as to provide not only its distinctive contours on the surface thereof but also a distinctive color highlighted by the background coloration of the body element 10. In this particular embodiment, the insert element 12 is not provided with apertures therethrough so as to expose any of the coloration of the underlying portion of the body element 10.

Figure 2:
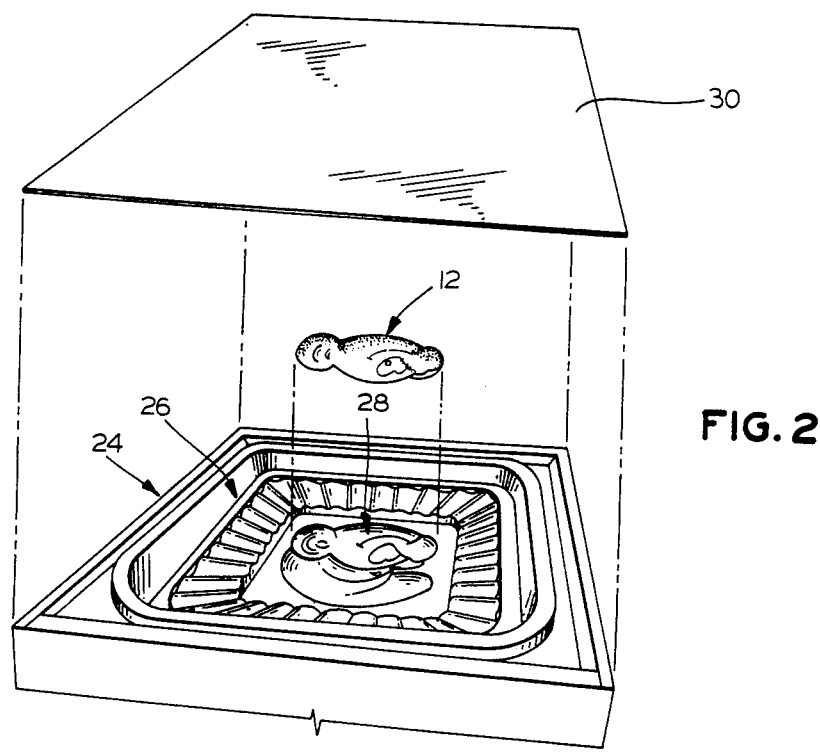
FIG. 2 is a partially diagrammatic view of a thermoforming mold for forming the article of FIG. 1 and showing the separately preformed insert spaced upwardly from the insert receiving cavity portion of the mold and further showing the large thermoplastic sheeting spaced upwardly from the mold before the thermoforming operation takes place.

As best seen in FIG. 2 the insert element 12 is preformed with a number of contours and depths which are maintained in the final article. The body element 10 provides a background panel portion 14, a frame portion 16, a peripheral portion 18, and a depending wall portion 20.

As seen in FIG. 2, the thermoforming mold is generally designated by the numeral 24 and provides a mold cavity generally indicated by the numeral 26 which includes an insert receiving portion 28 having a contour complimentary to that of the preformed insert element 12. As is customary, the remaining portion of the cavity 26 will have a contour which is complimentary to that of the desired thermoformed product, i.e., be female to the desired shape. Spaced above the insert element 12 and mold 24 is a length of thermoplastic sheet material 30 which is to be thermoformed into the body element 10 of the final article.

Figure 3:
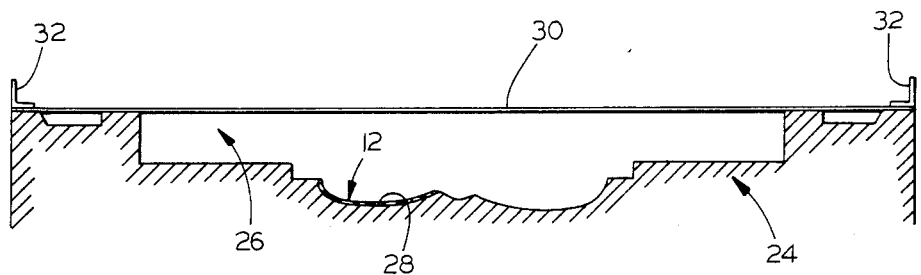
FIG. 3 is a partially diagrammatic sectional view showing the thermoforming mold with the insert seated in the insert receiving cavity and with the large thermoplastic sheeting clamped about the periphery of the mold and before the vacuum is drawn.
Figure 4:
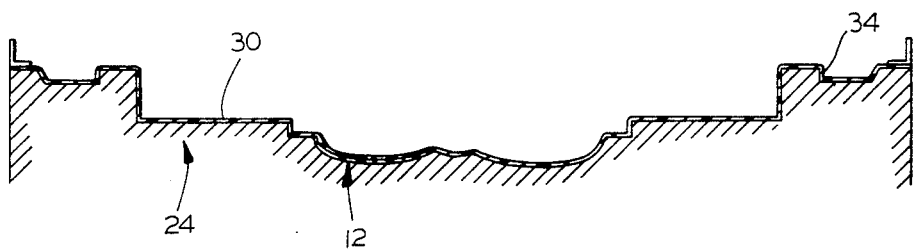
FIG. 4 illustrates the next step in the thermoforming operation after vacuum is applied to the heated thermoplastic sheeting to draw the thermoplastic sheeting tightly against the surface of the mold and against the exposed surface of the insert.

The two steps of the thermoforming operation are diagrammatically illustrated in FIGS. 3 and 4.

In FIG. 3, the thermoplastic material 30 is clamped onto the upper surface of the mold 24 by the clamps 32 and overlies the mold cavity 26. The insert element 12 is seated in the insert receiving cavity portion 28. After the sheet material 30 has been heated and the mold is also at temperature, vacuum is drawn through a myriad of small passages (not shown) in the mold as is conventional in a thermoforming mold so as to draw the readily deformable plastic material 30 downwardly into conformity with the contours of the mold cavity 26 and tightly against the exposed surface of the insert element 12. The resultant thermoformed article in the mold 24 is illustrated in FIG. 4. In a subsequent step, the scrap portion 34 of the article as thermoformed is cut by a suitable cutting die to produce the product illustrated in FIG. 1.

Figure 5:
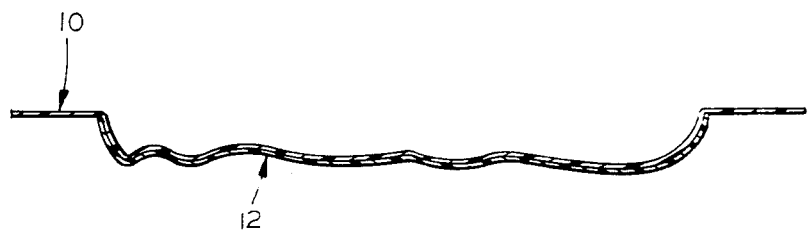
FIG. 5 is an enlarged fragmentary cross-sectional view of the thermoformed article showing the double layer of material at the insert portion and the single layer thereabout.

Turning now to FIG. 5, therein illustrated on a greatly enlarged scale is a fragmentary section through the article of FIG. 1 showing the multiple contours of the insert element 12 and the full conformity therewith of the body element 10. Although two clearly distinct layers are shown in this illustration, the preferred methods of the present invention utilize the same polymer for both insert element 12 and body element 10 respectively so that there is an amalgamation of the material at the interface, although two distinct colorations can be seen if a section is taken through the insert. Moreover, the two are thoroughly bonded to form a unitary structure.

Turning now to FIG. 6, another embodiment of the insert element 12 is shown and designated by the numeral 12a. Here the insert element 12 is provided with an aperture 36 therethrough corresponding to the eyes of this particular design element and thus exposing the coloration of the body element 10 therethrough as indicated by the stippling.

In the embodiment of FIG. 7, the insert element 12 has been greatly magnified in section so as to enable illustration of small holes 38 extending through sheet material of the insert element 12 for the purpose of drawing a vacuum therethrough. As will be readily appreciated, such holes 38 may be provided in the insert element 12 subsequent to the molding operation which produces it if vacuum forming is used, although sheeting may be prepunched if pressure forming with a mandrel is used or formed during an injection molding operation by a suitable configured mold.

In FIG. 8, there is illustrated a thermoformed sandbox cover which includes three insert elements 12, 40 and 42 spaced about and bonded to the body element 10. These several insert elements have different design contours and configurations and may be of the same or of totally different colors with respect to each other as well as with respect to the underlying body element 10.

Lastly, turning to FIG. 9, therein illustrated is the surface to be bonded of the insert element 12 having a multiplicity of closely spaced undercuts 44, small channels 45 and surface patterns 46 to facilitate evacuation of the air at the interface between the insert element 12 and the deforming sheet material 30. Such patterns 46, undercuts 44 and channels 45 may be formed in the insert member at the time that it is formed into its desired configuration by injection molding, thermoforming or stamping.

As is well known, various thermoplastic polymers may be thermoformed; among the polymers which may be desirably be employed in the process of the invention are high and low density polyethylene, polypropylene, polystyrene, impact polystyrene and acrylonitrile/styrene/butadiene interpolymers. Preferably, the insert element and body element are formed from the same polymer so as to facilitate bonding, although compatible polymers of different compositions may be employed is so desired such as for example an insert element of low density polyethylene and a body element of high density polyethylene, or a combination of high impact polystyrene for the insert and ABS polymer for the body element.

The insert may be injection molded from resin in contoured molds, or it may be formed from sheeting by thermoforming in suitable molds or by stamping using suitable dies.

Although the process which has been specifically described involves the application of vacuum to draw the sheet material into conformity with the mold, pressure forming and platen assisted vacuum forming may also be employed if so desired. However, it has been found that vacuum forming is readily and conveniently employed to form relatively large articles at relatively low cost. The molds utilized in the process may be either female cavity or male cavity depending upon the desired configuration for the final product. The above statements are also applicable with respect to molds which may be used in an initial thermoforming step to produce the insert.

Generally, the forming process for the insert should provide the desired surface finish on the surface to be placed against the mold and thereby exposed to view in the final article.

To enhance the bond between the insert and the body which is formed thereabout, the insert is desirably maintained in the mold at a temperature above ambient to ensure that it does not rapidly extract heat from the sheet material drawn thereagainst and also to facilitate the fusion of the material at the interfacing surfaces. Moreover, the vacuum being applied to the mold and to the sheet material being deformed thereabout is desirably continued for several seconds after the sheet material has been drawn against the insert and into conformity with the mold to ensure full conformity as the sheeting decreases in temperature.

As has been previously indicated, the articles of the present invention may utilize a single insert or more than one insert depending upon the desired pattern and appearance of the final product. Moreover, the several inserts may be of the same design or may each have a different design component, and they may be of the same color or may be each of different colors relative to the base member.

As used herein "differentially colored" means different colors, or different shades of the same color so as to be visually distinct to the viewer.

It may be desirable with larger inserts to provide very small passages through the insert to facilitate drawing a vacuum therethrough and thus drawing the sheet material of the body member tightly against the surface of the insert. An alternate means for achieving the same evacuation of the air from the interface between the two components is the provision of a pattern of embossments on the surface of the insert adjacent to the sheet material of the body member as indicated in FIG. 9. This embossing may comprise a series of ribs or channels or various raised patterns, to permit evacuation of the air to the margins of the insert. When utilized, the apertures through the insert may be conveniently formed as a separate processing step following the forming of the insert, or may be formed by injection molding using a mold of suitable design. When utilized, the channels or other embossments to facilitate evacuation may be formed as a part of the thermoforming step utilized for the insert.

Although not necessary since the use of compatible resins for the insert and body members will produce bonding of the two components at the interface, by their own substance, a heat activatible adhesive may be applied to the exposed surface of the insert to increase the degree of bonding or to permit the utilization of relatively incompatible polymers for the two components.

By the techniques of the present invention, various types of articles may be fabricated in relatively large sizes. The present invention has been found highly useful in producing decorative, low cost children's plastic pools, sandboxes and covers. It may also be utilized to provide attractive multicolored sleds, toboggans and the like. In addition to children's products, it can be appreciated that the invention has application to other types of products including cartons, placques, door panels and the like.

Moreover, the insert only may serve to provide a differential coloration and design component, but also may be used to provide enhanced strength for the thermoformed article in an area where such strength is required. It may also permit the reduction of the thickness of the sheet material used for the body member by providing enhanced strength where required in the composite structure.

Thus, it can be seen from the foregoing detailed description and attached drawings that the present invention provides unitary thermoformed articles of differential coloration. The process for making such articles is relatively simple and can be conducted relatively economically to provide extremely attractive products. Moreover, the finished articles may exhibit enhanced strength in areas where required as well as provide desired design elements of multicolored structure.

Having thus described the invention, I claim:

1. A unitary multicolored thermoplastic article including a body element and a substantially continuous contoured insert element of sheet-like nature on one surface of said body element and of lesser dimension than said body element so as to provide an exposed peripheral portion about said insert element, said insert element being preformed with at least two discrete depths providing a layer above said one surface of said body element and being differentially colored with respect thereto, said insert and body elements being bonded together and having a multiplicity of complimentary contours of at least two discrete depths in the area of said insert element to provide a first design component, said body element having a multiplicity of additional contours in said peripheral portion of at least two discrete depths.

2. The thermoplastic article of claim 1 wherein the adjacent surfaces of said body and insert elements are bonded together by their own substance.

3. The thermoplastic article of claim 1 wherein said insert element has apertures therein dimensioned to expose the body element therethrough whereby its coloration provides elements of a design denoted by the configuration and contours of said insert element.

4. The thermoplastic article of claim 3 wherein said insert element has additional small apertures therethrough spaced thereabout and dimensioned to permit drawing vacuum therethrough while concealing substantially said body element thereunder.

5. The thermoplastic article of claim 1 wherein said insert has small apertures spaced thereabout and dimensioned to permit drawing of a vacuum therethrough while concealing substantially said body element thereunder.

6. The thermoplastic article of claim 1 additionally including a second insert element spaced from said first element to provide a second design component.

7. The thermoplastic article of claim 6 wherein said second insert element is of a third color.

8. The thermoplastic article of claim 6 wherein the design component of said second insert element differs from that of said first element.

* * * * *